C. V. STATLER.
Shrinking and Punching Iron.
No. 71,079. Patented Nov. 19, 1867.
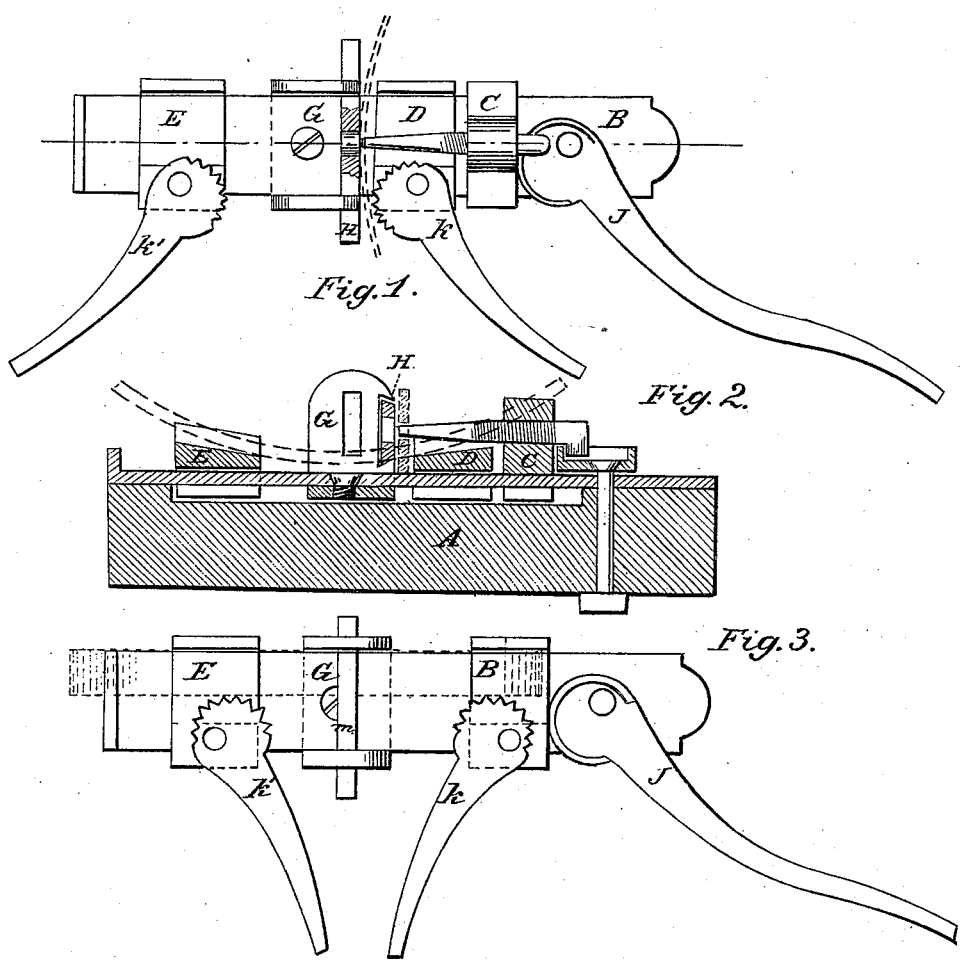
Witnesses.
Theo Tusche
Alfred R. Egerton
Inventor.
C. V. Statler

United States Patent Office.

C. V. STATLER, OF WOODHULL, ILLINOIS.

Letters Patent No. 71,079, dated November 19, 1867.

COMBINED SHRINKING AND PUNCHING MACHINE.

*The Schedule referred to in these Letters Patent and making part of the same.*

TO ALL WHOM IT MAY CONCERN:

Be it known that I, C. V. STATLER, of Woodhull, in the county of Henry, and State of Illinois, have invented a new and improved Combined Shrinking and Punching Machine; and I do hereby declare that the following is a full, clear, and exact description thereof, which will enable those skilled in the art to make and use the same, reference being had to the accompanying drawings, forming part of this specification.

This invention relates to a new and improved method of shrinking and punching wagon-tire and other articles, and it consists in griping the tire in two places, one of which gripes is stationary when used, and the other is movable; and in operating the movable gripe-block by an eccentric-lever, and also in operating a punch by the same lever, in connection therewith, as I will proceed to describe. In the accompanying plate of drawings—

Figure 1 represents a top view of the machine, showing it as arranged for punching.

Figure 2 is a side view of the same.

Figure 3 is a top view of the machine as arranged for shrinking.

Similar letters of reference indicate corresponding parts.

A is the block of wood to which the bar which supports the parts of the machine is attached. B is the supporting-bar. C is the punch-block. D is the movable clamp or gripe-block. E is a clamp or gripe-block, which is made fast when the machine is used for shrinking. G is the kink-block. H is a die, which is dovetailed into the kink-block G, standing edgewise, as seen in the drawing. J is the eccentric-lever, which is attached to the bar B by a bolt, as seen at $a$. $k$ is a gripe-lever, attached to the block D. $k'$ is a gripe-lever, which is attached to the block E.

For punching the tire or other bar of iron, it is placed in the machine as seen in fig. 1, in red.

For shrinking or upsetting tire or other articles of iron, as bars or bands, the punch-block C is removed, and the block D is brought back against the eccentric-lever J, as seen in fig. 3.

In fig. 2, a section of wagon-tire is seen in red, which shows the manner in which the tire is operated upon. A top view of the section of tire is seen in fig. 3, where the edges are griped in the blocks by the levers $k\ k'$. $m$ is a cross-bar, which is slipped into the kink-block G, through slots, as seen, for the purpose of holding down the tire.

When the tire is placed in this position, and the block E is made fast by a pin, or otherwise, it will be seen that, by applying power to the eccentric-lever J, the block D will be forced toward the centre; and if the tire is heated to a red heat, it will be upset or shrunk by the operation.

What I claim, and desire to secure by Letters Patent, is—

1. The bar B, the gripe-blocks D and E, with their levers $k\ k'$, the kink-block G, and the eccentric-lever J, when the same are constructed, arranged, and combined, substantially as shown and described, and for the purposes set forth.

2. In combination with the upsetting device set forth in the preceding claim, I claim the arrangement, as described, of the punch and punch-block C.

C. V. STATLER.

Witnesses:
WILLIAM PAYTON,
J. WESLEY KENAGY.